(12) United States Patent
Zhong et al.

(10) Patent No.: US 12,343,847 B2
(45) Date of Patent: Jul. 1, 2025

(54) HEAVY-DUTY VEHICLE MAINTENANCE TOOL AND A METHOD FOR MANUFACTURING SUCH A TOOL

(71) Applicant: Volvo Truck Corporation, Gothenburg (SE)

(72) Inventors: Yuan Zhong, Danderyd (SE); Lennart Olausson, Torslanda (SE); Denis Goyet, Rillieux la Pape (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 6 days.

(21) Appl. No.: 17/951,437

(22) Filed: Sep. 23, 2022

(65) Prior Publication Data

US 2023/0114309 A1 Apr. 13, 2023

(30) Foreign Application Priority Data

Oct. 11, 2021 (EP) .................................... 21201971

(51) Int. Cl.
*B25B 27/02* (2006.01)
*B25B 27/00* (2006.01)
(Continued)

(52) U.S. Cl.
CPC .......... *B25B 27/02* (2013.01); *B25B 27/0035* (2013.01); *B29C 64/153* (2017.08);
(Continued)

(58) Field of Classification Search
CPC .. B25B 27/0035; B25B 27/02; B25B 27/0028
See application file for complete search history.

(56) References Cited

U.S. PATENT DOCUMENTS 4,586,228 A * 5/1986 Rodolf ................ B25B 27/0028
206/230
5,528,809 A 6/1996 Green et al.
(Continued)

FOREIGN PATENT DOCUMENTS

CN 103143731 A 6/2013
WO 2021174230 A1 9/2021

OTHER PUBLICATIONS

Omnexus, Comprehensive Guide on Polyamide (PA) or Nylon, Screen shot taken on Nov. 14, 2019, available at https://omnexus.specialchem.com/selection-guide/polyamide-pa-nylon (Year: 2019).*

(Continued)

*Primary Examiner* — Kyle A Cook
(74) *Attorney, Agent, or Firm* — Sage Patent Group

(57) ABSTRACT

A heavy-duty vehicle maintenance tool applicable to mount or remove a component from a gearbox has a cylindrical shape with a predetermined extension along a central axis. The tool further including a cylindrical wall enclosing an inner cylindrical cavity and connecting an open first end and a closed second end. The tool has a first end arranged to be placed in contact with a corresponding surface on a component to be mounted and a second end arranged to be subjected to an external force in order to mount or remove the component. The second end includes an internal reinforcing lattice structure within the cavity. The tool is a lightweight, one-piece thermoplastic component and is produced using an additive manufacturing process.

19 Claims, 7 Drawing Sheets

(51) Int. Cl.
  *B29C 64/153* (2017.01)
  *B29C 64/165* (2017.01)
  *B33Y 10/00* (2015.01)
  *B33Y 80/00* (2015.01)
  *F16C 43/04* (2006.01)
  *B29K 71/00* (2006.01)
  *B29K 77/00* (2006.01)
  *B29L 31/28* (2006.01)

(52) U.S. Cl.
  CPC ............ *B29C 64/165* (2017.08); *B33Y 10/00* (2014.12); *B33Y 80/00* (2014.12); *F16C 43/04* (2013.01); *B29K 2071/00* (2013.01); *B29K 2077/00* (2013.01); *B29L 2031/28* (2013.01)

(56) References Cited

U.S. PATENT DOCUMENTS

| | | | |
|---|---|---|---|
| 7,191,504 | B1 | 3/2007 | Charron |
| 2016/0238324 | A1* | 8/2016 | Butcher ............... B29C 64/153 |
| 2019/0160638 | A1* | 5/2019 | Deleuze .............. B25B 27/0028 |

OTHER PUBLICATIONS

3DPrinting.com, How 3D Printed Lattice Structures Improve Mechanical Properties, Published Oct. 19, 2019, available at https://3dprinting.com/tips-tricks/3d-printed-lattice-structures/ (Year: 2019).*

Ajeet Kumar et al., Design and additive manufacturing of closed cells from supportless lattice structure, Additive Manufacturing vol. 33, Published May 2020 (Year: 2020).*
Lisle Corporation, 35650 // HD Thermostat Seal Installer, YouTube, Published on Nov. 26, 2018, available at https://www.youtube.com/watch?v=GoocuAwP0vE&t=29s (Year: 2018).*
Communication under Rule 71(3) for EP Patent Application No. 21201971.5, mailed Jan. 17, 2024, 30 pages.
Extended European Search Report dated Mar. 24, 2022 for European Patent Application No. 21201971.5, 5 pages.
Belter et al., "Strengthening of 3D Printed Fused Deposition Manufactured Parts Using the Fill Compositing Technique", PLoS ONE 10(4): e0122916, doi:10.1371/journal.pone.0122915, 19 pages.
Shapeways, Inc. ABEC 11 Drive Gear Pulley Removal Tool, accessed on the Internet on Aug. 26, 2022 at: https://www.shapeways.com/product/CL37U7V8J/abec-11-drive-gear-pulley-removal-tool, 4 pages.
Zockerbender, "Tools for Replacing rear differential bushings (mounts) for BMW vehicles", Jul. 3, 2016, accessed on the Internet on Aug. 26, 2022 at: https://www.thingiverse.com/thing:1657073, 3 pages.
Stlbase, BMW tools for STL Files for 3D Printers, accessed on the Internet on Aug. 26, 2022 at: https://stlbase.com/browse/bmw+tools/, 2 pages.
Youmagine, 3D printed bearing removal tool, accessed on the Internet on Aug. 26, 2022 at: https://www.youmagine.com/designs/bearing-removal-tool-2, 4 pages.
Github, 3D printed bearing removal tool, accessed on the Internet on Aug. 26, 2022 at: https://github.com/bzed/3d-bearing-removal tool, 4 pages.

* cited by examiner

HEAVY-DUTY VEHICLE MAINTENANCE TOOL AND A METHOD FOR MANUFACTURING SUCH A TOOL

CROSS REFERENCE TO RELATED APPLICATIONS

The present application claims benefit of priority to European Patent Application No. 21201971.5, filed Oct. 11, 2021, is assigned to the same assignee as the present application, and is incorporated herein by reference in its entirety.

TECHNICAL FIELD

The disclosure relates to a heavy-duty vehicle maintenance tool applicable to mount or remove a component from a gearbox and a method for manufacturing such a tool.

BACKGROUND OF THE DISCLOSURE

Tools used for maintenance of heavy-duty vehicles, in particular for maintenance of gearboxes in such vehicles are subject to relatively high forces. An example of a maintenance tool used for this purpose is a drift, which is used for mounting or removing components such as bearings and/or sealings used for supporting rotary shafts and other components in a vehicle gearbox.

A drift for a heavy-duty vehicle gearbox is made from steel and can weigh around 1.5-2 kg depending on the size and diameter of the component to be mounted or removed. The original tool is manufactured by assembling a machined cylindrical section and a flat end section and welding the two metal parts together. Handling a tool this size is very heavy for the person performing the maintenance/repair, in particular if the component to be maintained is located in a confined space or is otherwise difficult to access.

A further problem is that the tool must be used with care during the maintenance process, as both mounting and removing a component involves the application of a percussive force to one end of the drift. The percussive force can be applied using e.g. a hammer or a similar suitable tool, in order to ease a replacement component into place or to gradually knock a damaged component out of its seat in the gearbox. If the tool is handled or positioned incorrectly, the seat or the area surrounding the component may be damaged during the application of a percussive force.

An object of the disclosure is to provide an improved heavy-duty vehicle maintenance tool and a method for manufacturing a tool that solves the above problems.

SUMMARY OF THE DISCLOSURE

The above problems have been solved by a heavy-duty vehicle maintenance tool and a manufacturing method as claimed in the appended claims.

In this context, the term "heavy-duty vehicle" denotes vehicles such as trucks, wheel loaders and similar work vehicles or commercial vehicles. The tool described below is intended for use in gearbox maintenance for such heavy-duty vehicle. In the subsequent text, the tool is described as having a "front end" and a "rear end". In operation, the front end is located facing the gearbox and contacting the component to be mounted or removed. Similarly, the rear end is located facing an operator of the tool and arranged to be subjected to a percussive force by the operator to either mount or remove the component. For each of these operations, a different tool is used, as the front end of each tool will extend a predetermined distance into a seat or similar opening in the gearbox. The term "closed cells" is used to describe a structure cells with adjoining walls and where each cell comprises multiple walls enclosing an internal space. The disclosure is not limited to cells of a certain size or wall thickness. The dimensions of the cells can be calculated to provide the rear end of the tool with sufficient strength and impact resistance to withstand repeated blows from a hammer or a percussive tool. A cell having a minor hole or opening in one of its walls is defined as a closed cell and the term is not limited hermetically sealed cells. This is opposed to an "open cell", wherein at least one wall making up the cell has been removed. In operation, the tool will be subjected to a percussive force in order to force a component into or out of its seat. Percussive force can be applied manually, using a hammer, or by means of a separate tool that can generate a percussive force. The term "component" is used to denote a part of the gearbox to be mounted or replaced. In the examples listed here, the component is a bearing or sealing for a rotary or axially slidable component in the gearbox. Such components are mounted in an opening commonly referred to as a seat.

According to a first aspect, the disclosure relates to a heavy-duty vehicle maintenance tool applicable to mount or remove a component from a gearbox. The tool has a generally cylindrical shape with a predetermined extension along a central axis. The tool further comprises a cylindrical wall enclosing an inner cylindrical cavity, which cylindrical wall connects an open first end and a closed second end. The first end comprises an annular portion with an annular end surface at right angles to the central axis which annular portion is arranged to be placed in contact with a corresponding surface on a component to be mounted. The operation of the tool will be described in further detail below. The component is a bearing or a sealing for rotary shafts in the gearbox. The second end comprises a circular wall with an outer end surface at right angles to the central axis, which end surface is arranged to be subjected to an external force in order to remove or mount the component. The second end comprises an internal reinforcing lattice structure within the cavity. The tool is a one-piece thermoplastic component.

According to a first example, the lattice comprises multiple closed cells joined to the circular and cylindrical walls of the cavity and extending a predetermined distance away from the circular wall.

According to a second example, the lattice comprises multiple layers of closed cells joined to the circular and cylindrical walls of the cavity and extending a predetermined distance away from the circular wall.

According to a third example, the lattice comprises multiple reinforcing ribs joined to the circular and cylindrical walls of the cavity and extending a predetermined distance away from the circular wall.

The first end of the tool has a stepped cross-section where each step comprises an annular surface at right angles to the central axis and where the steps increase in diameter in the direction away from the first end. When mounting an annular component, such as a bearing or sealing, the component is placed around an outer end portion of the tool and in contact with a corresponding surface formed by the annular surface of a step located remote from the outermost end section of the tool. The tool can then be positioned concentrically with a corresponding seat in a vehicle gearbox, where after a percussive force is applied to the closed end of the tool. The component will then be forced into position in its seat. A further step located to the rear of the step supporting the component can form a stop. When the rear step contacts the gearbox, this indicates that the component is located correctly, and the tool can be withdrawn. Removal of a component is performed in reverse. In this case, a tool having a first end with a step having an annular surface corresponding to the annular surface of the component is fitted with a cylindrical extension and positioned concentrically over the component. While maintaining the tool and the extension in contact with the component, the second end of the tool is subjected to a percussive force in order to force the component through and out of its seat. The extension has a cross-section with the same annular surface as the corresponding surface on the tool and on the component to be removed. The length of the extension is selected for each individual component to be removed. A relatively short extension can be selected if the component alone needs to be removed out of its seat. However, if the component to be removed supports a rotary shaft extending out through the component, then the combined internal length of the extension and the internal cavity of the tool must be able to accommodate the outer end of the shaft.

According to a first example, the tool is an additive manufactured component. A tool manufactured in this way can comprise a lattice comprising one or more layers of multiple closed cells joined to the circular and cylindrical walls of the cavity.

According to a second example, the tool is an injection molded component. A tool manufactured in this way can comprise a lattice comprising multiple reinforcing ribs joined to the circular and cylindrical walls of the cavity and extending a predetermined distance away from the circular wall in the direction of the central axis.

The tool can be made from a suitable thermoplastic material, such as polyamide 11 (PA11). polyamide 12 (PA12), polyether-etherketone (PEEK) or polyetherketoneketone (PEKK). According to the disclosure other suitable materials having the required impact resistant properties can be employed.

According to a second aspect, the disclosure relates to a method for manufacturing a heavy-duty vehicle maintenance tool as described above. The method involves receiving a computer representation of the tool and a plan for the tool to be deposited using an additive manufacturing process. In this representation, the tool comprises an accumulation of layers of material deposited by the additive manufacturing process. The plan comprises a tool-path representation of the printable product part and process parameters.

The method further involves the steps of:
- depositing a layer of powdered polymer material in accordance with the plan;
- heating the surface of the layer to be covered by the subsequent layer, causing melting/sintering of the layer to be covered; and
- repeating the deposition and heating steps until the plan is completed.

According to a first example, the additive manufacturing process includes fabricating the tool by Laser Powder Bed Fusion (LPBF). According to a second example, the additive manufacturing process includes fabricating the tool by Multi Jet Fusion (MJF). The additive manufacturing process includes fabricating the tool from a polymer material such as polyetheretherketone (PEEK), polyether-ketoneketone (PEKK), polyamide 11 (PA11) or polyamide 12 (PA12).

An advantage of the inventive tool is that it will give a considerable weight saving. Depending on the material selected, a weight saving of up to 85% is possible. In this way, a conventional metal tool weighing 2 kg can be replaced by a thermoplastic tool weighing 300 g. The inventive tool is therefore more ergonomic as it reduces the strain on the operator using the tool.

A further advantage is that the tool is less likely to damage the component or the gearbox if operated incorrectly. As the thermoplastic material of the tool has a lower hardness than the metallic material of the component or gearbox, the tool itself is unlikely to cause any damage.

Finally, if the tool is damaged then it will be considerably cheaper to print a new tool using additive manufacturing than to manufacture and weld together the parts required for a tool made from a metallic material.

BRIEF DESCRIPTION OF THE DRAWINGS

In the following text, the disclosure will be described in detail with reference to the attached drawings. These schematic drawings are used for illustration only and do not in any way limit the scope of the disclosure. In the drawings.

DETAILED DESCRIPTION

Figure 1:
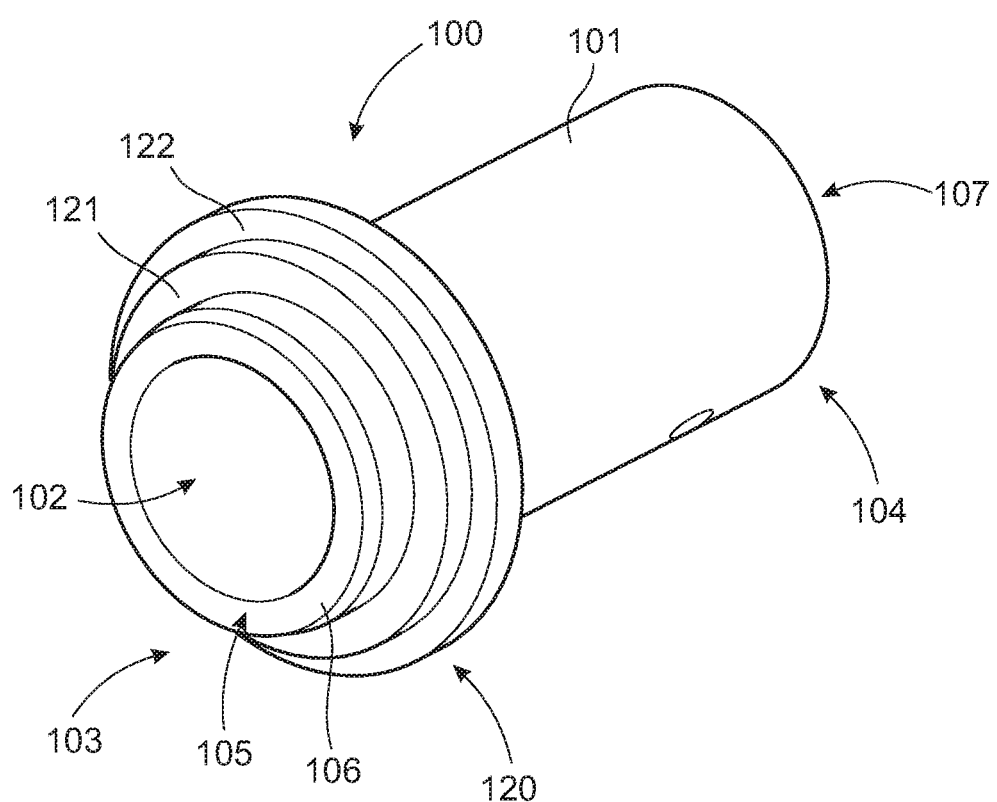
FIG. 1 shows a schematic perspective view of a tool according to the disclosure.

FIG. 1 shows a schematic perspective view of a tool according to the disclosure. The figure shows a heavy-duty vehicle maintenance tool 100 applicable to mount or remove a component from a gearbox. The tool has a cylindrical shape with a predetermined extension along a central axis X and comprises a cylindrical wall 101 enclosing an inner cylindrical cavity 102. The cylindrical wall 101 connects an open first end 103 and a closed second end 104. The first end 103 comprises an annular portion 105 with an annular end surface 106 at right angles to the central axis X. The annular portion 105 is located at the front end of the tool and is arranged to be placed in contact with a corresponding surface on a component to be mounted. The first end 103 of the tool has a stepped cross-section 120 where each step comprises an annular surface 121, 122 at right angles to the central axis X and where the steps increase in diameter in the direction away from the first end 103. The annular surface 121 of a first step is located a predetermined distance behind the annular end surface 106, which distance is substantially equal to the thickness, or height of the component to be mounted. The annular surface 122 of a second step is located a predetermined distance behind the annular surface 121 of a first step, which distance is equal to the required axial displacement of the component to be mounted when it is forced into its seat. The second end 104 comprises a circular wall 107 with an outer end surface 108 at right angles to the central axis X, which end surface 108 is arranged to be subjected to an external force in order to mount or remove the component. The second end 104 comprises an internal reinforcing lattice structure within the cavity 102. The tool is a one-piece thermoplastic component made by additive manufacturing. The internal lattice structure will be described in further detail below. Note that the reference numbering used for FIG. 1 will be retained for the same component parts in the subsequent examples described in FIGS. 2-8.

In operation, a component to be mounted is placed around the annular portion 105 at the first end 103 of the tool. The component is further located by pushing it into contact with a corresponding surface formed by the annular surface 121 of a first step located behind the annular end surface 106 of the tool. The tool can then be positioned concentrically with a corresponding seat in a vehicle gearbox (see FIG. 9), where after a percussive force is applied to the closed end of the tool. The component will then be forced into position in its seat. The annular surface 122 of a second step, located to the rear of the first step supporting the component, can form a stop. When the second step contacts a surface of the gearbox surrounding the seat, this indicates that the component is located correctly, and the tool can be withdrawn. The component mounted in this way can be a bearing or sealing.

Figure 2:
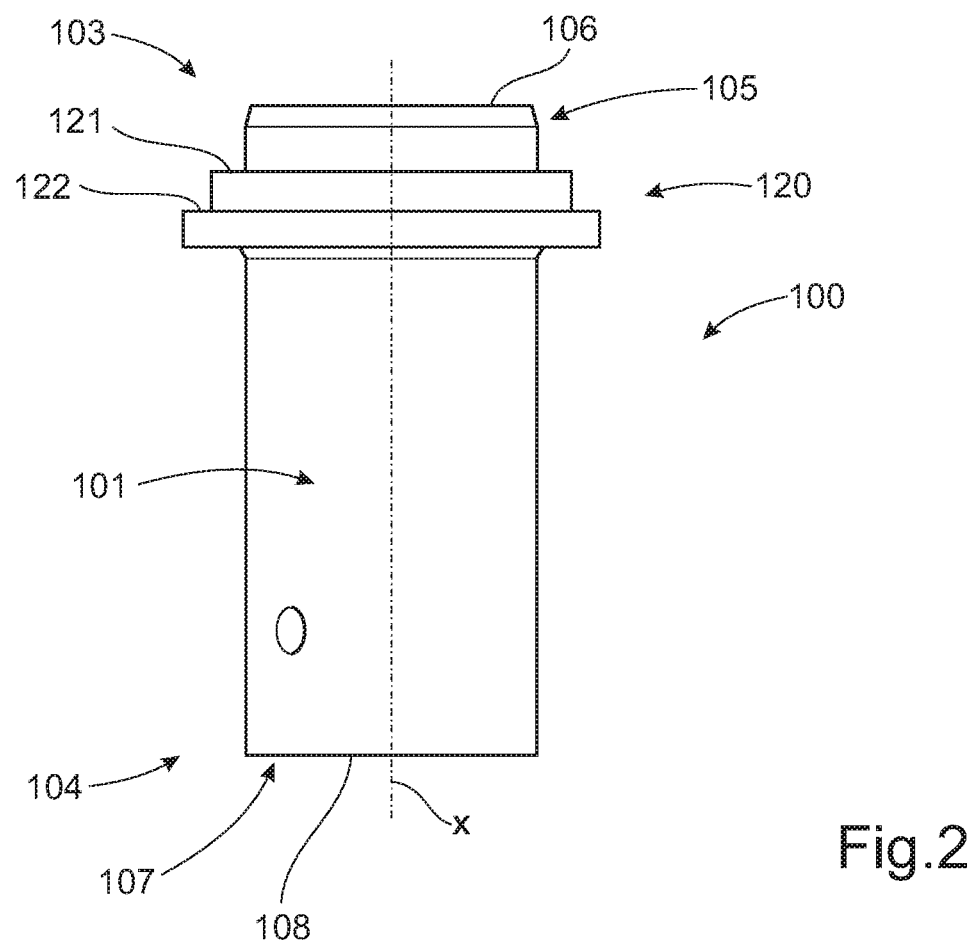
FIG. 2 shows a schematic side view of the tool in FIG. 1.

FIG. 2 shows a schematic side view of the tool in FIG. 1. As shown in FIG. 2, the tool comprises a cylindrical wall 101 connecting the open first end 103 and the closed second end 104. The first end 103 comprises the front annular portion 105 with its annular end surface 106 at right angles to the central axis X. The annular portion 105 at the front end of the tool is arranged to be placed in contact with a corresponding surface on a component to be mounted. The first end 103 of the tool comprises the stepped cross-section 120 where each step comprises an annular surface 121, 122 at right angles to the central axis X and where the steps increase in diameter in the direction away from the first end 103. The annular surface 121 of a first step is located a predetermined distance behind the annular end surface 106, which distance is substantially equal to the thickness, or height of the component to be mounted. The annular surface 122 of a second step is located a predetermined distance behind the annular surface 121 of a first step, which distance is equal to the required axial displacement of the component to be mounted when it is forced into its seat. The second end 104 comprises a circular wall 107 with its outer end surface 108 at right angles to the central axis X, which end surface 108 is arranged to be subjected to an external force in order to mount or remove the component.

Figure 3:
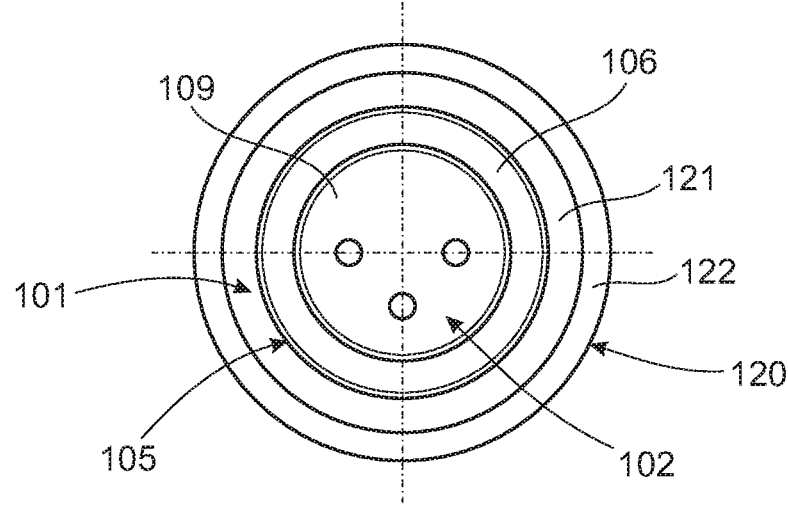
FIG. 3 shows a schematic plan view of the front end of the tool in FIG. 2.

FIG. 3 shows a schematic plan view of the front end of the tool in FIG. 2. FIG. 3 shows the annular end surface 106 of the annular portion 105 used for centering the component on the tool and around which the component is located for mounting. The figure further shows the stepped cross-section 120 and its first and second steps comprising a respective annular surface 121, 122. FIG. 3 further shows the inner cylindrical cavity 102 and its end wall 109 within the cylindrical wall 101.

Figure 4:
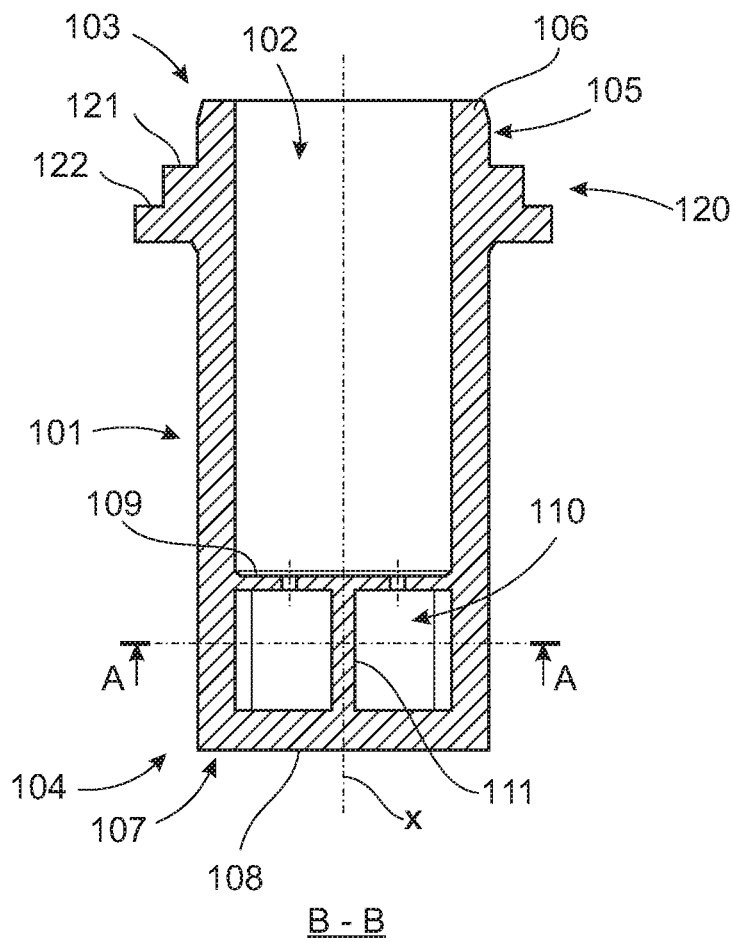
FIG. 4 shows a schematic vertical cross-section of the tool in FIG. 2.

FIG. 4 shows a schematic vertical cross-section of the tool in FIG. 2. As shown in FIG. 4, the tool comprises a cylindrical wall 101 connecting the open first end 103 and the closed second end 104. The first end 103 comprises the front annular portion 105 with its annular end surface 106 at right angles to the central axis X. The annular portion 105 at the front end of the tool is arranged to be placed in contact with a corresponding surface on a component to be mounted. The first end 103 of the tool comprises the stepped cross-section 120 where each step comprises an annular surface 121, 122 at right angles to the central axis X and where the steps increase in diameter in the direction away from the first end 103. The annular surface 121 of a first step is located a predetermined distance behind the annular end surface 106, which distance is substantially equal to the thickness, or height of the component to be mounted. The annular surface 122 of a second step is located a predetermined distance behind the annular surface 121 of a first step, which distance is equal to the required axial displacement of the component to be mounted when it is forced into its seat. The second end 104 comprises a circular wall 107 with its outer end surface 108 at right angles to the central axis X, which end surface 108 is arranged to be subjected to an external force in order to mount or remove the component.

FIG. 4 illustrates a cross-section of the reinforcing lattice structure at the second end 104 of the tool. In this example the lattice structure comprises multiple closed cells 110 joined to the cylindrical wall 101 and the circular wall 107 at the rear end of the tool. The cells 110 extend between the circular wall 107 at the rear end of the tool and the circular wall 109 of the cavity 102. The lattice structure comprises a number of substantially vertical walls 111 extending between and joined to the cylindrical wall 101. The walls 111 further extend between and are joined to the circular wall 107 and the end wall 109 of the cylindrical cavity 102 to form a layer of closed cells.

Figure 5:
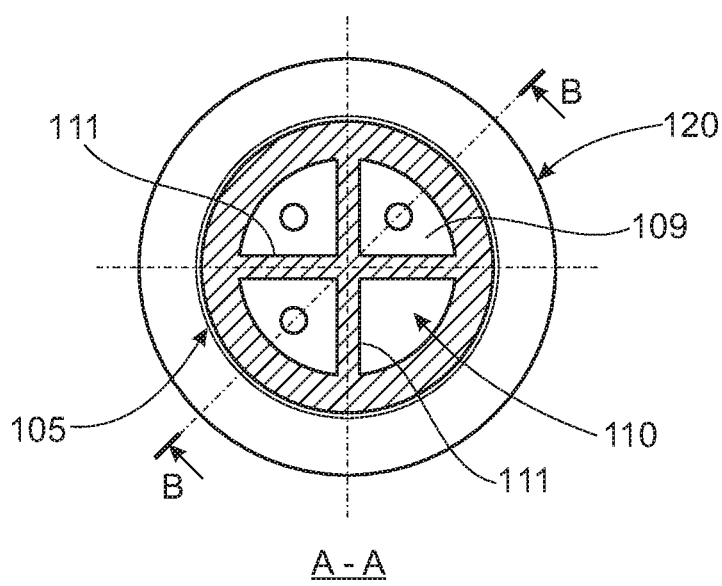
FIG. 5 shows a schematic cross-section of the tool in FIG. 4.

FIG. 5 shows a schematic cross-section of the tool in FIG. 4. In particular, the cross-section is taken through the reinforced second end 104 at right angles to the central axis X. FIG. 5 shows the lattice structure comprising multiple closed cells 110 joining the circular wall 107 and the end wall 109 of the cylindrical cavity 102 within the cylindrical wall 101. The figure also shows a section through the substantially vertical walls 111 making up the lattice structure.

Figure 6:
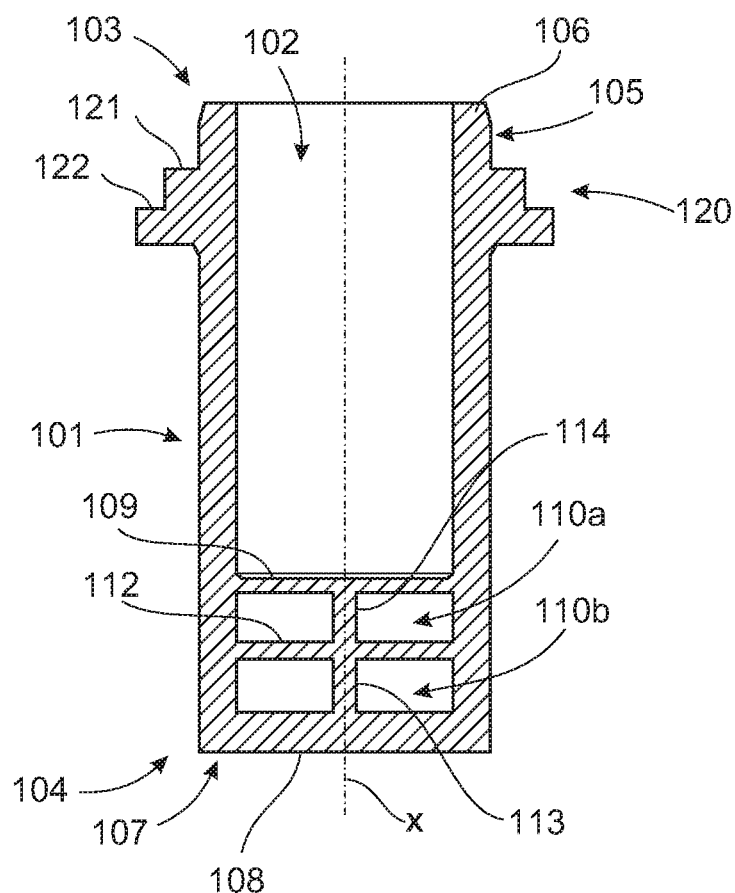
FIG. 6 shows a schematic vertical cross-section of a first alternative embodiment of the tool in FIG. 4.

FIG. 6 shows a schematic vertical cross-section of a first alternative embodiment of the tool in FIG. 2. As shown in FIG. 6, the tool comprises a cylindrical wall 101 connecting the open first end 103 and the closed second end 104. The first end 103 comprises the front annular portion 105 with its annular end surface 106 at right angles to the central axis X. The annular portion 105 at the front end of the tool is arranged to be placed in contact with a corresponding surface on a component to be mounted. The first end 103 of the tool comprises the stepped cross-section 120 where each step comprises an annular surface 121, 122 at right angles to the central axis X and where the steps increase in diameter in the direction away from the first end 103. The annular surface 121 of a first step is located a predetermined distance behind the annular end surface 106, which distance is substantially equal to the thickness, or height of the component to be mounted. The annular surface 122 of a second step is located a predetermined distance behind the annular surface 121 of a first step, which distance is equal to the required axial displacement of the component to be mounted when it is forced into its seat. The second end 104 comprises a circular wall 107 with its outer end surface 108 at right angles to the central axis X, which end surface 108 is arranged to be subjected to an external force in order to mount or remove the component.

FIG. 6 illustrates a cross-section of an alternative reinforcing lattice structure at the second end 104 of the tool. In this example the lattice structure comprises layers of multiple closed cells 110a, 110b joined to the cylindrical wall 101 and the circular wall 107 at the rear end of the tool. A first layer of cells 110b extends between the circular wall 107 at the rear end of the tool and an intermediate circular wall 112. A second layer of cells 110a extends between the intermediate circular wall 112 and the circular wall 109 of the cavity 102. The lattice structure comprises a number of substantially vertical walls 113, 114 extending between and joined to the cylindrical wall 101. The walls 111 further extend between and are joined to the circular wall 107, the intermediate wall 112 and the end wall 109 of the cylindrical cavity 102 to form two layers of closed cells.

Figure 7:
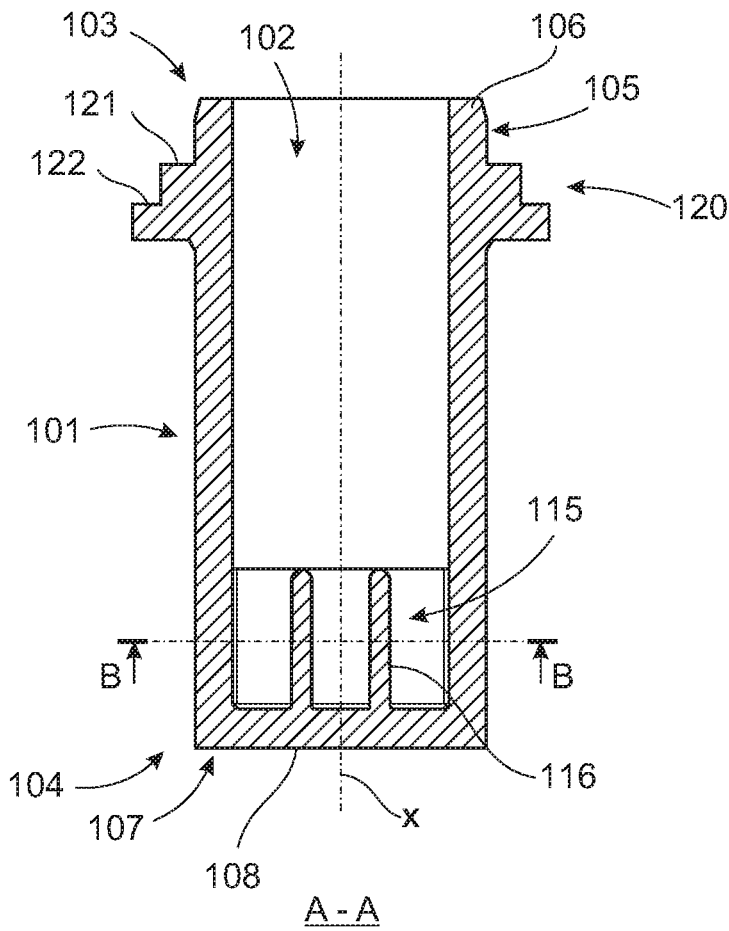
FIG. 7 shows a schematic vertical cross-section of a second alternative embodiment of the tool in FIG. 4.

FIG. 7 shows a schematic vertical cross-section of a second alternative embodiment of the tool in FIG. 2. As shown in FIG. 7, the tool comprises a cylindrical wall 101 connecting the open first end 103 and the closed second end 104. The first end 103 comprises the front annular portion 105 with its annular end surface 106 at right angles to the central axis X. The annular portion 105 at the front end of the tool is arranged to be placed in contact with a corresponding surface on a component to be mounted. The first end 103 of the tool comprises the stepped cross-section 120 where each step comprises an annular surface 121, 122 at right angles to the central axis X and where the steps increase in diameter in the direction away from the first end 103. The annular surface 121 of a first step is located a predetermined distance behind the annular end surface 106, which distance is substantially equal to the thickness, or height of the component to be mounted. The annular surface 122 of a second step is located a predetermined distance behind the annular surface 121 of a first step, which distance is equal to the required axial displacement of the component to be mounted when it is forced into its seat. The second end 104 comprises a circular wall 107 with its outer end surface 108 at right angles to the central axis X, which end surface 108 is arranged to be subjected to an external force in order to mount or remove the component.

FIG. 7 illustrates a cross-section of an alternative reinforcing lattice structure at the second end 104 of the tool. In this example the lattice structure comprises multiple open cells 115 joined to the cylindrical wall 101 and the circular wall 107 at the rear end of the tool. The cells 110 extend between the circular wall 107 and a predetermined distance into the cavity 102. The lattice structure comprises a number of substantially vertical walls 116 extending between and joined to the cylindrical wall 101. The walls 116 are joined to the circular wall 107 and extend forwards a predetermined distance into the cylindrical cavity 102 to form a grid of open cells 115.

Figure 8:
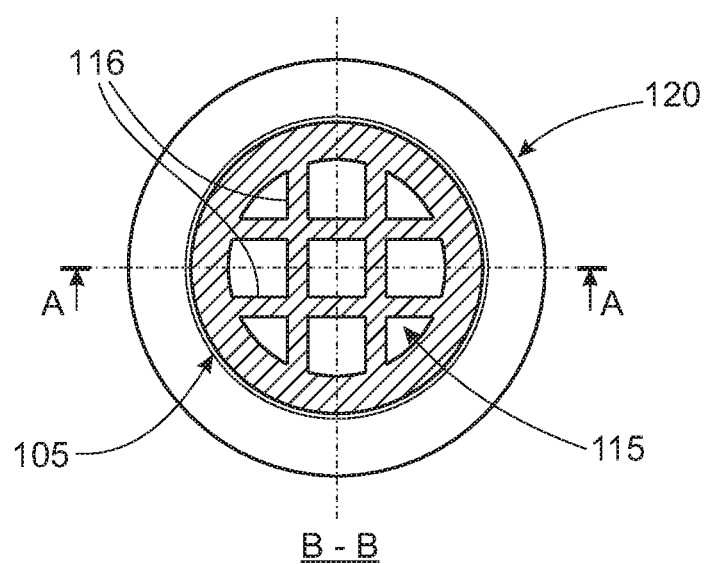
FIG. 8 shows a schematic cross-section of the tool in FIG. 7.

FIG. 8 shows a schematic cross-section of the tool in FIG. 7. In particular, the cross-section is taken through the reinforced second end 104 at right angles to the central axis X. FIG. 8 shows the lattice structure comprising multiple open cells 115 joining the circular wall 107 and the second end of the tool within the cylindrical wall 101. The figure also shows a section through the substantially vertical walls 116 making up the open cells 115 of the reinforcing lattice structure.

Figure 9:
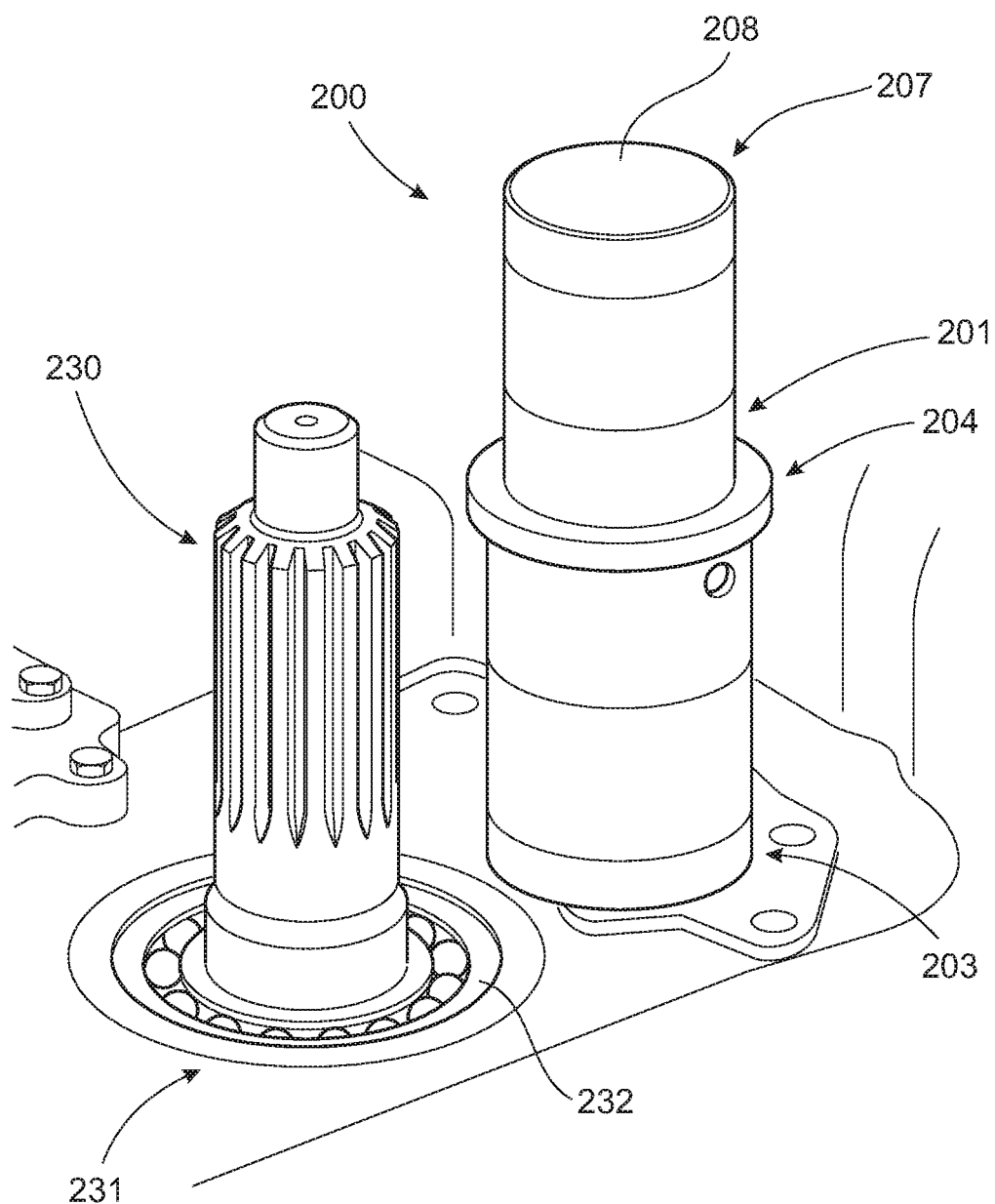
FIG. 9 shows a schematic view of a gearbox and a tool prior to removal of a component.

FIG. 9 shows a schematic view of a gearbox and a tool prior to removal of a component. As described in connection with FIG. 1 above, the first end of the tool has an annular portion (see FIG. 1; "105") with an annular end surface at the front of the tool. With reference to FIG. 1, the first end of the tool further comprises a stepped cross-section (see FIG. 1; "120") where each step comprises an annular surface at right angles to the central axis and where the steps increase in diameter in the direction away from the first end.

When mounting an annular component, such as a bearing or sealing, the component is placed around an outer end portion of the tool and in contact with a corresponding surface formed by the annular surface (see FIG. 1; "121") of a first step located remote from the outermost end section of the tool. The tool can then be positioned concentrically with a corresponding seat in a vehicle gearbox, where after a percussive force is applied to the closed end of the tool. The component will then be forced into position in its seat. A further second step is located to the rear of the first step supporting the component, which second step has an annular surface (see FIG. 1; "122") forming a stop. The tool shown in FIG. 9 can be identical to any one of the tools in shown in FIGS. 1-8, or a similar tool dimensioned for a smaller or larger component.

Prior to removing a component, the tool shown in FIG. 1 is used in combination with an extension device. FIG. 9 shows a tool 200 as described in connection with FIG. 1 combined with an extension 203 mounted onto the annular portion (see FIG. 1; "105") of the tool and in contact with the annular surface (see FIG. 1; "121") on a first step of a stepped section 204 of the tool. The extension 203 will extend forward of the tool 201 and contact the component. As a consequence, the tool will only be in indirect contact with the component to be removed.

In operation, the cylindrical extension 203 mounted on the tool 201 is positioned concentrically onto an annular surface 232 of a component 231 to be removed. As can be seen in FIG. 9, the component 231 to be removed supports a rotary shaft 230 extending out of the gearbox and through the component 231. The combined internal length of the extension 203 and the internal cavity of the tool 201 must be sufficient to accommodate at least the outer end of the shaft 230. While maintaining the tool 201 and the extension 203 in contact with the component 231, a circular surface 208 at a rear second end 207 of the tool is subjected to a percussive force in order to force the component 231 through and out of its seat. The extension 203 has a cross-section with the same dimensions as the annular surface as the corresponding surface on the tool and on the component to be removed. The length of the extension is selected for each individual component to be removed. A relatively short extension can be selected if the component alone needs to be removed out of its seat. However, if the component to be removed supports a rotary shaft extending out through the component, as shown in FIG. 9, then the combined internal length of the extension and the internal cavity of the tool must be able to accommodate the outer end of the shaft.

Figure 10:
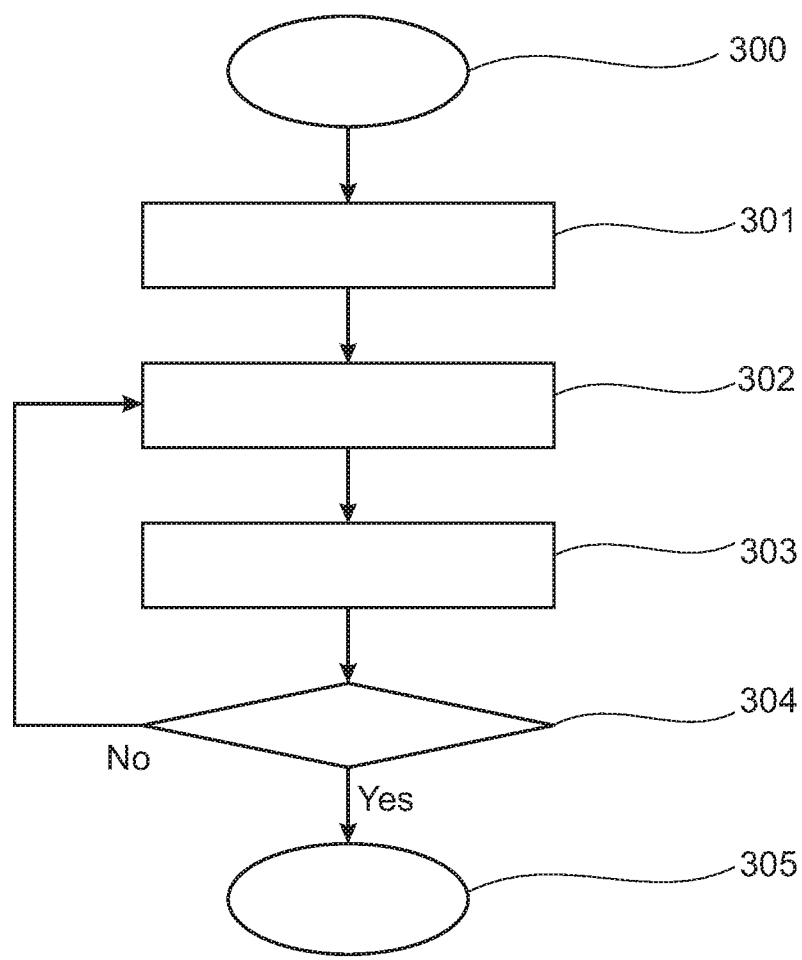
FIG. 10 shows a schematic flow chart for a manufacturing method for a tool.

FIG. 10 shows a schematic flow chart for a manufacturing method for a tool as described in the above examples. The manufacturing method involves the following steps. The method initially involves starting 300 the manufacturing process. In a first step 301 the method involves receiving a computer representation of the tool and a plan for the tool to be deposited using an additive manufacturing process. In this form the tool comprises an accumulation of layers of material to be deposited by the additive manufacturing process. The plan comprises a tool-path representation of the printable product part and process parameters. In a second step 302 the method involves depositing a layer of powdered polymer material in accordance with the plan. In a third step 303 the method involves heating the surface of the layer to be covered by the subsequent layer, causing melting/sintering of the layer to be covered. In a fourth step 304 the method involves checking if the plan has been completed. If this is not the case, then the method returns to the second step 302 and repeats the deposition and heating steps. If it is determined that the plan has been completed, then the method proceeds to a final step 305 and ends the process.

The additive manufacturing process employed by the method can include fabricating the tool by Laser Powder Bed Fusion (LPBF). Alternatively, the additive manufacturing process can include fabricating the tool by Multi Jet Fusion (MJF).

The additive manufacturing process includes fabricating the tool from polyetheretherketone (PEEK), polyether-ketoneketone (PEKK), polyamide 11 (PA11) or polyamide 12 (PA12). According to the disclosure other suitable materials having the required impact resistant properties can be employed.

The disclosure should not be deemed to be limited to the embodiments described above, but rather a number of further variants and modifications are conceivable within the scope of the following patent claims.

What is claimed is:

1. A vehicle maintenance tool applicable to mount or remove a component from a gearbox, the tool comprising:
    a cylindrical shape with a predetermined extension along a central axis; and
    a cylindrical wall enclosing an inner cylindrical cavity and connecting an open first end and a closed second end,
    the first end comprising an annular portion with an annular end surface at right angles to the central axis which annular portion is arranged to be placed in contact with a corresponding surface on a component to be mounted, wherein the first end of the tool further includes a stepped cross-section comprising at least two steps, wherein each of the two steps comprises an annular surface at a right angle to the central axis, wherein each of the steps has a larger diameter than the annular end surface, and wherein the two steps increase in diameter in the direction away from a front end of the tool;
    the second end comprising a circular wall with an outer end surface at a right angle to the central axis, which end surface is arranged to be subjected to an external force to mount or remove the component; and
    the second end comprising an internal reinforcing lattice structure within the cavity, wherein the internal reinforcing lattice comprises multiple closed cells that are located between an end wall of the closed second end and the circular wall at a rear end of the tool, such that the multiple closed cells are delimited by i) the circular wall, ii) a second circular wall, and iii) at least one vertical wall whose ends terminate at and connect to the circular wall and the second circular wall; and
    wherein the tool is a one-piece thermoplastic component.

2. The tool according to claim 1, wherein the lattice comprises multiple layers of closed cells.

3. The tool according to claim 1, wherein the tool is an additive manufactured component.

4. The tool according to claim 1, wherein the tool is made from at least one of polyamide 11 and polyamide 12.

5. The tool according to claim 1, wherein the tool is made from at least one of polyether-etherketone and polyetherketoneketone.

6. The tool according to claim 1, wherein the tool is a drift applicable to mount or remove bearings, sealings and other annular components in a gearbox.

7. The tool according to claim 1, wherein the multiple closed cells extend a predetermined distance away from the circular wall.

8. The tool according to claim 7, wherein the lattice comprises multiple layers of closed cells.

9. A vehicle maintenance tool applicable to mount or remove a component from a gearbox, the tool comprising:
    a cylindrical shape with a predetermined extension along a central axis; and
    a cylindrical wall enclosing an inner cylindrical cavity and connecting an open first end and a closed second end,
    the first end comprising an annular portion with an annular end surface at a right angle to the central axis which annular portion is arranged to be placed in contact with a corresponding surface on a component to be mounted, wherein the first end of the tool further includes a stepped cross-section comprising at least two steps, wherein each of the two steps comprises an annular surface at a right angle to the central axis, wherein each of the steps has a larger diameter than the annular end surface, and wherein the two steps increase in diameter in the direction away from a front end of the tool;
    the second end comprising a circular wall with an outer end surface at a right angle to the central axis, which end surface is arranged to be subjected to an external force to mount or remove the component; and
    the second end comprising an internal reinforcing lattice structure within the cavity, wherein the internal reinforcing lattice comprises multiple closed cells that are located between an end wall of the closed second end and the circular wall at a rear end of the tool, such that the multiple closed cells are delimited by i) the end wall, ii) the circular wall, and iii) at least one vertical wall whose ends terminate at and connect to the end wall and the circular wall; and
    wherein the tool is a one-piece thermoplastic component.

10. The tool according to claim 9, wherein the multiple closed cells extend a predetermined distance away from the circular wall.

11. The tool according to claim 9, wherein the tool is an additive manufactured component.

12. The tool according to claim 9, wherein the tool is made from at least one of polyamide 11 and polyamide 12.

13. The tool according to claim 9, wherein the tool is made from at least one of polyether-etherketone and polyetherketoneketone.

14. The tool according to claim 9, wherein the tool is a drift applicable to mount or remove bearings, sealings and other annular components in a gearbox.

15. A method of manufacturing a vehicle maintenance tool, the method comprising:
    receiving a computer representation of a tool and a plan for the tool to be deposited using an additive manufacturing process, the tool comprising:
        a cylindrical shape with a predetermined extension along a central axis; and
        a cylindrical wall enclosing an inner cylindrical cavity and connecting an open first end and a closed second end,
        the first end comprising an annular portion with an annular end surface at a right angle to the central axis which annular portion is arranged to be placed in contact with a corresponding surface on a component to be mounted, wherein the first end of the tool further includes a stepped cross-section comprising at least two steps, wherein each of the two steps comprises an annular surface at a right angle to the central axis, wherein each of the steps has a larger diameter than the annular end surface, and wherein the two steps increase in diameter in the direction away from a front end of the tool;

the second end comprising a circular wall with an outer end surface at a right angle to the central axis, which end surface is arranged to be subjected to an external force to mount or remove the component; and the second end comprising an internal reinforcing lattice structure within the cavity, wherein the internal reinforcing lattice comprises multiple closed cells that are located between an end wall of the closed second end and the circular wall at a rear end of the tool, such that the multiple closed cells are delimited by i) the circular wall, ii) a second circular wall, and iii) at least one vertical wall whose ends terminate at and connect to the circular wall and the second circular wall; and the plan comprising a tool-path representation of the tool and process parameters; wherein the method comprises:

depositing a layer of powdered polymer material in accordance with the plan;

heating the surface of the layer to be covered by a subsequent layer, causing melting/sintering of the layer to be covered; and repeating the deposition and heating steps until the plan is completed and the tool is formed as a one-piece thermoplastic component.

16. The method according to claim 15 wherein the additive manufacturing process includes fabricating the tool by Laser Powder Bed Fusion.

17. The method according to claim 15 wherein the additive manufacturing process includes fabricating the tool by Multi Jet Fusion.

18. The method according to claim 15, wherein the additive manufacturing process includes fabricating the tool from at least one of polyetheretherketone and polyetherketoneketone.

19. The method according to claim 15, wherein the additive manufacturing process includes fabricating the tool from at least one of polyamide 11 and polyamide 12.

* * * * *